Figures 3, 4:
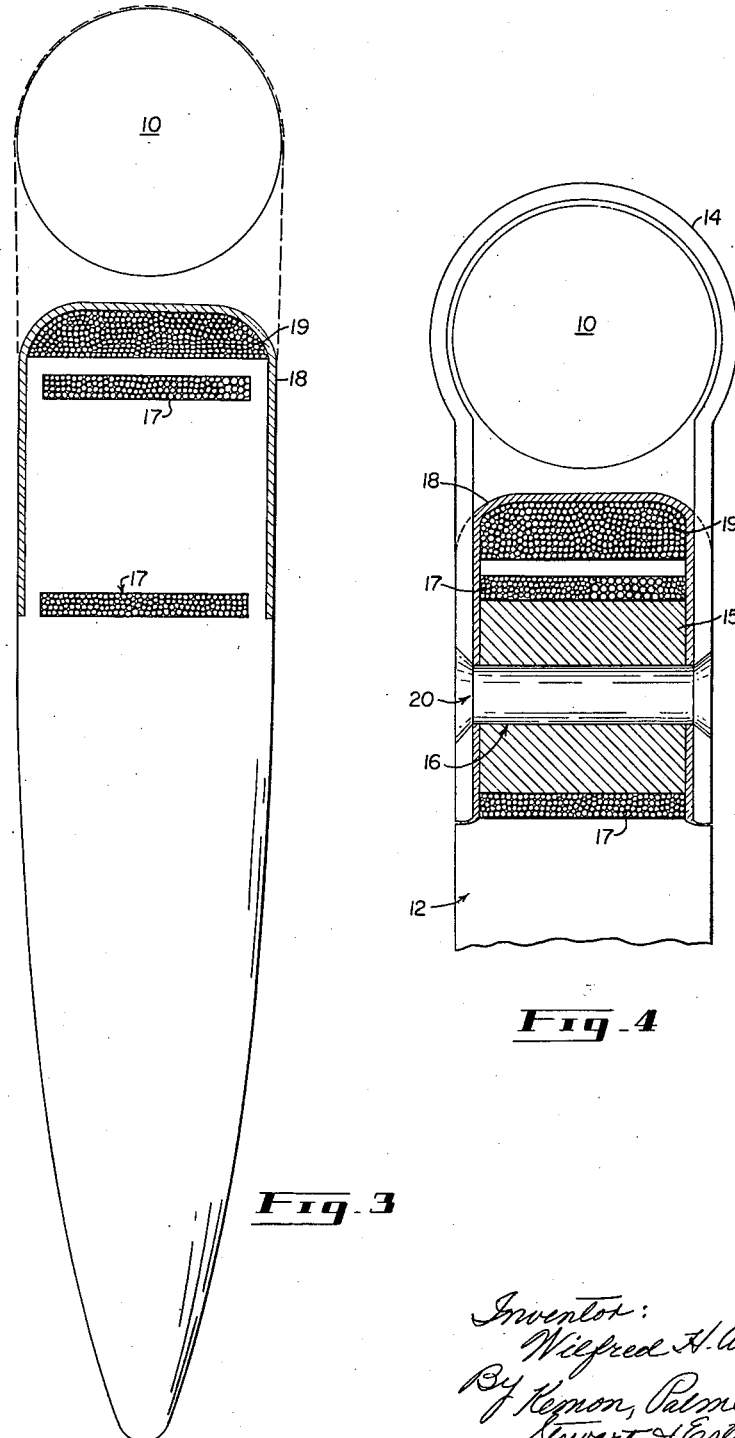

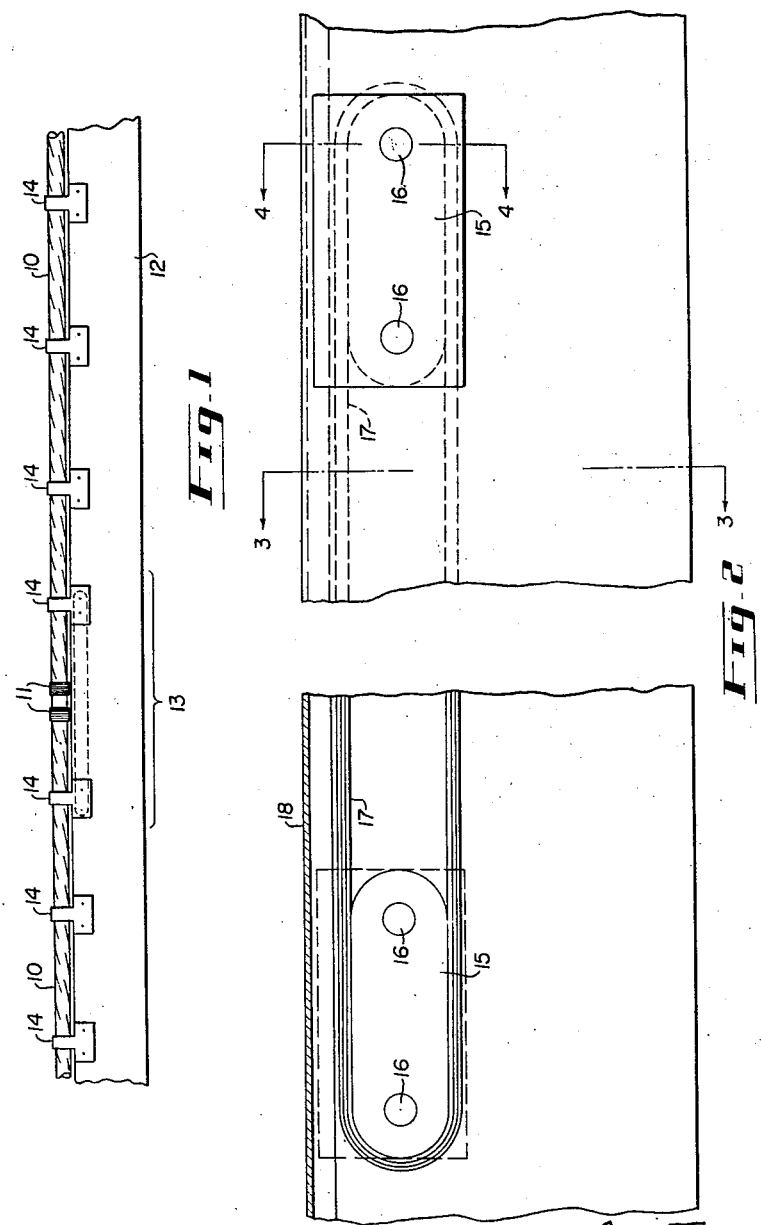

June 4, 1963 W. H. ARMSTRONG 3,092,067
TANDEM FAIRING
Filed March 27, 1961 2 Sheets-Sheet 2

Inventor:
Wilfred H. Armstrong
By Kenyon, Palmer,
Stewart & Estabrook
Attorneys

United States Patent Office 3,092,067
Patented June 4, 1963

3,092,067
TANDEM FAIRING
Wilfred Hugh Armstrong, Dartmouth, Nova Scotia, Canada, assignor to Her Majesty the Queen in right of Canada, as represented by the Minister of National Defence
Filed Mar. 27, 1961, Ser. No. 98,450
Claims priority, application Canada Aug. 31, 1960
11 Claims. (Cl. 114—235)

The present invention relates to a cable assembly for towing a device behind a ship.

When sonar equipments are mounted in the hull of a ship, the detection range of submarine targets may be short due to the refractive effects. By placing the sonar transducer at a depth determined by water conditions greater ranges may be achieved. In addition, quenching is eliminated and the transducer can deliver greater power to the water. In order that the sonar transducer may be maintained at desired depth, towed variable depth sonar devices have been developed which may be towed behind a ship and which are coupled to the ship by means of a cable. This cable serves a dual function of providing both the mechanical connection between the ship and the towed sonar apparatus and including the electrical connections to the sonar transducer equipment. These cables are normally of circular cross section and when drawn through the water cause considerable turbulence which causes cable drag and consequent loss of depth of the towed body, destructive vibrations, and noise. In order to overcome this turbulence the shape of the cable may be altered by including a fairing which streamlines the overall shape of the cable. In the past cables have been constructed having a streamlined cross section in order to reduce this undesirable turbulence. This streamlined cross section if for any reason canted at angle to the towing direction will exert a lateral thrust and tend to cause excessive motion of the towed sonar equipment. This excessive motion may take the form of oscillations from side to side or changes in depth, or the sonar body may assume a position to one side of the ship. In order to overcome the disadvantages of known cables having a streamlined shape, the present invention provides a method reducing turbulent flow around a non-streamlined cable which comprises attaching to the cable a flexible streamlined fairing substantially constrained from relative longitudinal motion with respect to the cable and free for rotation about the cable. Thus the fairing which serves the purpose of reducing turbulence inherent in a non-streamlined cable is so fixed to the cable that no lateral forces will be exerted on the cable and the cable will tend to stream directly behind the towing vessel. When the towing vessel changes direction the fairing will be free to rotate about the cable so that the fairing will trail behind the cable without exerting any lateral force.

In drawings which illustrate an embodiment of the invention:

FIGURE 1 is a side view of a section of cable constructed in accordance with the invention, FIGURE 2 is a plan view of an anchored section from the flexible fairing in FIGURE 1, FIGURE 3 is a cross section on the line 3—3 of FIGURE 2, and FIGURE 4 is a cross section on the line 4—4 of FIGURE 2.

Referring to FIGURE 1, a cable 10 is shown to which are swaged anti-telescoping rings 11. The streamlined fairing 12 having anchor sections 13 is held to the cable 10 by means of a plurality of clips 14. The clips 14 having an inner diameter larger than the outside diameter of the cable 10 and consequently the clips 14 may move freely about the cable 10. The streamlined fairing 12 is constructed of a flexible material such as reinforced rubber which serves two purposes, firstly, the flexibility of the fairing makes it relatively easy to wind on a drum when the cable is payed out or drawn in, and secondly, the flexibility of the fairing permits different sections of the fairing at different positions along the cable to be at different angles with respect to the towed line. This may be desirable when the vessel is making a tight turn.

FIGURE 2 is a detailed view on a large scale of one of the anchor sections 13 of FIGURE 1. As may be seen in FIGURE 2, the anchor section 13 is fitted with a pair of brass anchor blocks 15 each block being provided with a pair of holes 16 extending therethrough. The anchor blocks 15 are held in the anchored section 13 by being pressed into the material of the fairing and also by anchor strips 17 encircling the two anchor blocks and extending through the material of the fairing between the blocks. The edge of the fairing 12 which is adjacent the cable 10 is provided with a binder strip 18 of cotton, nylon or other suitable fabric to protect the surface of the fairing from abrasion with the cable. The anchor strips 17 are provided to connect the anchor blocks 15 which are situated on opposite sides of the anti-telescoping rings 11, thus when the clips 14 are connected with the anchor blocks 15 any forces due to the clip 14 contacting an anti-telescoping ring 11 are transmitted via the anchor strips 17 to the adjacent anchor block 15 to prevent damage to the fairing.

As may be seen in FIGURE 3 the anchor strips 17 are embedded in the material of the fairing and the binder strip 18 is wrapped around the edge of the fairing adjacent the cable. Also shown in FIGURE 3 are the nylon reinforcing plies 19 which extend along the edge of the fairing adjacent the cable beneath the binder strip 18.

Referring to FIGURE 4, the cable clip 14 is shown surrounding the cable 10 and connected to the anchor block 15 by means of the flush rivet 20 fastened through the hole 16. The sides of the fairing 12 are reduced in width so that the cable clip 14 is flush with the surface of the fairing. These reduced sides of the fairings form mirror-imaged depressions.

In use the flexible fairing 12 is fastened to the cable 10 by means of the cable clips 14 and the towed sonar apparatus is attached on the lower end of the cable. The cable is payed out from the ship with the flexible fairing. The swaged rings 11 are so positioned that they prevent the fairing 12 from substantial longitudinal motion relative to the cable 19 and the inside diameter of the cable clips 14 being sufficiently greater than the outer diameter of the cable 10 permits the fairing freely to rotate about the cable 10.

I claim:
1. A turbulence inhibiting fairing assembly for use with non-streamlined submarine towing cables, which assembly comprises, in combination:
  (i) A continuous streamlined fairing having;
    (a) an axis of symmetry substantially normal to the longitudinal axis of the cable, and a longitudinal axis substantially parallel to said cable,
    (b) a leading edge,
    (c) a trailing edge,
    (d) opposed side surfaces, interconnecting said edges, and spaced apart by an amount not exceeding the diameter of the said cable
    (e) a plurality of apertures, located adjacent the leading edge and extending, normal to the axis of symmetry, from one side surface to the other, and spaced along the longitudinal axis thereof,

(ii) a plurality of U-shaped clips, each partially encircling said cable, and adapted hingedly to attach said fairing to said cable, and each constituted by;
   (a) a pair of arms integrally connected together at one end thereof by a curved portion,
   (b) an aperture on each arm, said pair of arms being adapted to receive therebetween, the opposed side surfaces of said fairing, adjacent the leading edge thereof, said curved portion having an internal radius sufficient to permit relative rotation between it and the said cable, and
   (c) a plurality of rivets, each adapted to attach a said clip to said fairing, said rivets passing through associated said apertures in said arms and associated said aperture in said fairing, and each having a head formed thereon after assembly.

2. A turbulence inhibiting fairing assembly for use with non-streamlined submarined towing cables which assembly comprises in combination:
(i) a continuous streamlined fairing having;
   (a) an axis of symmetry substantially normal to the longitudinal axis of the cable, and a longitudinal axis substantially parallel to said cable,
   (b) a leading edge,
   (c) a trailing edge,
   (d) opposed side surfaces interconnecting said edges, and spaced apart by an amount not exceeding the diameter of said cable,
   (e) a plurality of mirror-imaged depressions on the side surfaces adjacent the leading edge and spaced along the longitudinal axis thereof,
   (f) a plurality of apertures located adjacent the leading edge, normal to the axis of symmetry, from the depression on one side to the depression on the other side and spaced along the longitudinal axis thereof.
(ii) a plurality of U-shaped clips, each partially encircling said cable and adapted hingedly to attach said fairing to said cable and each constituted by;
   (a) a pair of arms integrally connected together at one end thereof by a curved portion,
   (b) an aperture in each arm, said pair of arms being adapted to receive, therebetween, the opposed side surfaces of said fairing, adjacent the leading edge thereof, said curved portion having an internal radius sufficient to permit relative rotation between it and the said cable, and
(iii) a plurality of rivets, each adapted to attach said clip to said fairing, said rivets passing through associated said apertures in said arms and associated said aperture in said fairing, and each having a head formed thereon after assembly.

3. The assembly of claim 1 including anti-telescoping rings swaged to and spaced along said cable.

4. The assembly of claim 2 including anti-telescoping rings swaged to and spaced along said cable.

5. The assembly of claim 1 wherein said fairing is constructed of a flexible material such as reinforced rubber.

6. The assembly of claim 2 wherein said fairing is constructed of a flexible material such as reinforced rubber.

7. The assembly of claim 1 including a plurality of transverse anchor blocks spaced longitudinally along and contained within said fairing and each having a transverse hole adapted to receive said rivet.

8. The assembly of claim 2 including a plurality of transverse anchor blocks spaced longitudinally along and contained within said fairing and each having a transverse hole adapted to receive said rivet.

9. The assembly of claim 1 including a continuous binder strip of fabric formed around said leading edge and extending toward the trailing edge for a distance substantially equal to the length of said arms in contact with said fairing.

10. The assembly of claim 2 including a continuous binder strip of fabric formed around said leading edge and extending towards trailing edge for a distance substantially equal to the length of said arms in contact with said fairing.

11. A turbulence inhibiting fairing assembly for use with non-streamlined submarine towing cables which assembly comprises in combination:
(i) a continuous streamlined fairing having;
   (a) an axis of symmetry substantially normal to the longitudinal axis of the cable, and a longitudinal axis substantially parallel to said cable,
   (b) a leading edge,
   (c) a trailing edge,
   (d) opposed side surfaces, interconnecting said edges, and spaced apart by an amount not exceeding the diameter of said cable,
   (e) a plurality of pairs of mirror-imaged depressions on the side surfaces adjacent the leading edge and spaced along the longitudinal axis thereof,
   (f) a plurality of apertures located adjacent the leading edge, extending, normal to the axis of symmetry, from the depression on one side to the depression on the other side and spaced along the longitudinal axis thereof,
   (g) a continuous binder strip of fabric formed around said leading edge and extending toward the trailing edge for a distance substantially equal to the length of said arms in contact with said fairing,
(ii) a plurality of U-shaped clips, each partially encircling said cable and adapted hingedly to attach said fairing to said cable and each constituted by;
   (a) a pair of arms integrally connected together at one end thereof by a curved portion,
   (b) an aperture in each arm, said pair of arms being adapted to receive, therebetween, the opposed side surfaces of said fairing, adjacent the leading edge thereof, said curved portion having an internal radius sufficient to permit relative rotation between it and the said cable, and
(iii) a plurality of rivets, each adapted to attach said clip to said fairing, said rivets passing through associated said apertures in said arms and associated said aperture in said fairing, and each having a head formed thereon after assembly;
(iv) a plurality anti-telescoping rings swaged to and spaced along said cable.

References Cited in the file of this patent

UNITED STATES PATENTS

| | | |
|---|---|---|
| 2,397,957 | Freeman | Apr. 9, 1946 |
| 2,859,836 | Wiener | Nov. 11, 1958 |
| 2,891,501 | Rather | June 23, 1959 |

FOREIGN PATENTS

| | | |
|---|---|---|
| 108,761 | Great Britain | Aug. 23, 1917 |